(12) United States Patent
Bazerman et al.

(10) Patent No.: US 6,850,253 B1
(45) Date of Patent: Feb. 1, 2005

(54) REPRESENTING NETWORK LINK AND CONNECTION INFORMATION IN A GRAPHICAL USER INTERFACE SUITABLE FOR NETWORK MANAGEMENT

(75) Inventors: Mark L. Bazerman, Ottawa (CA); Richard P. Heaps, Ottawa (CA); Nicola Benvenuti, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 569 days.

(21) Appl. No.: 09/746,201

(22) Filed: Dec. 26, 2000

(51) Int. Cl.[7] .............................................. G06K 15/00
(52) U.S. Cl. ...................................... 345/734; 345/773
(58) Field of Search ................................ 345/734–739, 345/771–773, 762–763, 802–805, 853–854, 712–713, 768

(56) References Cited

U.S. PATENT DOCUMENTS

| | | | | |
|---|---|---|---|---|
| 5,870,769 A | * | 2/1999 | Freund ........................ | 707/501 |
| 5,884,056 A | * | 3/1999 | Steele ......................... | 345/721 |
| 6,018,748 A | * | 1/2000 | Smith ......................... | 707/501 |
| 6,112,015 A | | 8/2000 | Planas et al. .......... | 395/200.53 |
| 6,141,006 A | * | 10/2000 | Knowlton et al. .......... | 345/734 |
| 6,154,212 A | * | 11/2000 | Eick et al. .................. | 345/734 |
| 6,229,538 B1 | * | 5/2001 | McIntyre et al. ........... | 345/734 |
| 6,307,841 B1 | * | 10/2001 | Rowles et al. .............. | 370/252 |
| 6,362,840 B1 | * | 3/2002 | Burg et al. ................. | 345/835 |
| 6,421,722 B1 | * | 7/2002 | Bauer et al. ................ | 709/224 |
| 6,665,714 B1 | * | 12/2003 | Blumenau et al. .......... | 709/222 |
| 6,711,127 B1 | * | 3/2004 | Gorman et al. ............. | 370/230 |

* cited by examiner

*Primary Examiner*—Steven Sax

(57) ABSTRACT

A method, network management tool, graphical user interface or computer readable medium in which network link and connection information is represented by lines having different visual characteristics that are used to represent in-service links, out-of-service links, and connections. In particular, the lines representing the connections may overlay and cover or obscure one of the lines representing the in-service or out-of-service links while not covering or only partially covering the other. In a particular embodiment, out-of-service links are represented by thin broken lines, in-service links are represented by thick solid lines that are thicker than the thin broken lines, and connections are represented by thin solid lines that are at least as thick as the thin broken lines and have a pattern or color different from the thick solid lines and which may overlay and cover or obscure one of the lines representing the links.

24 Claims, 5 Drawing Sheets

REPRESENTING NETWORK LINK AND CONNECTION INFORMATION IN A GRAPHICAL USER INTERFACE SUITABLE FOR NETWORK MANAGEMENT

FIELD OF THE INVENTION

The present invention relates to a method, tool, and computer readable medium for representing network link and connection information in a graphical user interface suitable for network management.

BACKGROUND OF THE INVENTION

It is common to employ one of many existing network management tools to manage computer and/or telecommunications networks. Network management tools typically run on a computer and provide a graphical user interface (GUI) that displays network objects and their state or status. These network management tools enable the maintenance, surveillance and administration of the network objects which make up the network by providing an interface through which information and commands may be passed such as alarm monitoring, test and diagnosis of faults, performance monitoring and connection management. The network objects that make up a network include network nodes such as hubs, switches and the like, and network links between network nodes, such as wire and fiber optic cables and the like.

The network management tools for a telecommunications network are typically more complex than those for a computer network in that telecommunications network nodes and connections are more complex and can simultaneously be in one or more of a large number of states.

In order to handle this complexity, certain network management tools have been developed which use Bellcore and ISO (International Standards Organization) standards which specify a set of generic states and statuses that network objects forming part of a telecommunications network can be in. The network management tools using these standards typically create their own visual indications or representations of the various states and statuses for display on a computer screen. Generally, network objects are represented by icons and the various attributes of the icons, such as outlines, shadings, line types or the like, can be varied to indicate the state or status of the network icons. One such network management tool system is described in U.S. Pat. No. 6,112,015 to Planas.

While network management tools employing standards based visual indicators provide considerable detail, they are often overly complex both in the amount of information presented and in the interrelationships between the representations of the various states and statuses. Recently, network management systems are being deployed to end users of networks. It is important for these end users that the network management tools and the graphical user interface to work with the tools be relatively simple and easy to understand without excessive study.

SUMMARY OF THE INVENTION

The present invention provides a system for the representation of network link and connection information in a network management graphical user interface in which lines having different visual characteristics are used to represent in-service links, out-of-service links, and connections. In particular, the lines representing the connections may overlay and cover or obscure one of the lines representing the in-service or out-of-service links while not covering or only partially covering the other. In a particular embodiment, out-of-service links are represented by thin broken lines, in-service links are represented by thick solid lines that are thicker than the thin broken lines, and connections are represented by thin solid lines that are at least as thick as the thin broken lines and thinner than the thick solid lines but having a different color or pattern than the thick solid lines. In this case, the connections may generally overlay the lines representing the links and, further, may cover the lines representing the out-of-service links. This method provides for a simple representation of the network link state and connection status that is easily understood by a network end user, including a color-blind end user. Also, the display of the state of the links and the display of the status of the connection are independent.

In accordance with an aspect of the present invention there is provided a method for representing network link and connection information in a graphical user interface suitable for network management, the method including receiving information about network link state and connection status within a network; and operating an output device to represent each link in a first state as a line having a first visual characteristic, represent each link in a second state that is different from the first state as a line having a second visual characteristic, different from the first visual characteristic, and represent a connection on a given network link as a line having a third visual characteristic, different from the first and second visual characteristics, such that, when the given network link is in the first state, the line representing the connection completely covers the line representing the given network link and, when the given network link is in the second state, the line representing the connection does not completely cover the line representing the given network link.

In a particular case, when the given network link is in the second state, the line representing the connection may partially cover the line representing the given network link. Further, the line representing the connection may cover the line representing the given network link such that a margin of the line representing the given network link is visible.

In another particular case, the first state may be an out-of-service state and the second state may be an in-service state.

In yet another particular case, the line having the first visual characteristic may be a thin and broken line and the line having the second visual characteristic may be thicker than the line having the first visual characteristic. In this case, the line having the third visual characteristic may be a thin and solid line that is at least the same thickness as the line having the first visual characteristic and less than the thickness of the line having the second visual characteristic. Alternatively or in addition, the line having the third visual characteristic may include a pattern or color that is different from either of the first visual characteristic and the second visual characteristic.

In yet another particular case, each of the line having the first visual characteristic, the line having the second visual characteristic, and the line having the third visual characteristic may be a different color from the others.

In accordance with another aspect of the present invention there is provided a method for representing network link and connection information in a network management graphical user interface which includes receiving information about the link state and connection status within a network, and operating an output device to represent out-of-service links with a thin broken line, represent in-service links with a thick solid line, thicker than the thin broken line, and represent connections on a given link as a thin solid line that is at least as thick as the thin broken line and thinner than the thick solid line.

In a particular case, the thin solid line may be overlayed on the thick solid line or the thin solid line to represent a connection on a given link. In this case, the thin solid line may obscure the thin broken line when overlayed thereon.

In another particular case, the thin broken line may be a dashed line.

In still another particular case, each of the thin broken line, the thick solid line and the thin solid line may each be a different color or pattern from the others. For example, the thick solid line may be green, the thin solid line may be yellow, and the thin broken line may be red.

In accordance with yet another aspect of the present invention there is provided a computer readable medium containing computer executable code for adapting a computer input with network link and connection information to output each link in a first state as a line having a first visual characteristic, output each link in a second state that is different from the first state as a line having a second visual characteristic, different from the first visual characteristic, and output a connection on a given network link as a line having a third visual characteristic, different from the first and second visual characteristics, such that, when the given network link is in the first state, the line representing the connection completely covers the line representing the given network link and, when the given network link is in the second state, the line representing the connection does not completely cover the line representing the given network link.

In a particular case, when the given network link is in the second state, the line representing the connection may partially cover the line representing the given network link. Further, the line representing the connection may cover the line representing the given network link such that a margin of the given network link is visible.

In another particular case, the first state may be an out-of-service state and the second state may be an in-service state.

In yet another particular case, any of the line having the first visual characteristic, the line having the second visual characteristic, and the line having the third visual characteristic may be a different pattern or color from the others.

In accordance with yet another aspect of the present invention there is provided a network management tool comprising a system for receiving information about network link state and connection status within a network, an output device, and a control system for operating the output device to represent each link in a first state as a line having a first visual characteristic, represent each link in a second state that is different from the first state as a line having a second visual characteristic, different from the first visual characteristic, and represent a connection on a given network link as a line having a third visual characteristic, different from the first and second visual characteristics, such that, when the given network as link is in the first state, the line representing the connection completely covers the line representing the given network link and, when the given network link is in the second state, the line representing the connection does not completely cover the line representing the given network link.

In accordance with yet another aspect of the present invention there is provided a graphical user interface for displaying network link and connection information, the graphical user interface displaying each network link in a first state as a line having a first visual characteristic, each network link in a second state that is different from the first state as a line having a second visual characteristic, different from the first visual characteristic, and a connection on a given network link as a line having a third visual characteristic, different from the first and second visual characteristics, such that, when the given network link in the first state, the line representing the connection completely covers the line representing the given network link and, when the given network link is in the second state, the line representing the connection does not completely cover the line representing the given network link.

In a particular case, the display of the connections is independent of the display of the network links.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

A telecommunications network consists of an interconnected set of network objects. There are two basic types of network objects, (i) network elements or nodes, and (ii) network; links or transmission systems connecting the network elements.

Examples of network elements in a telecommunications network include voice switches, packet switches, cross connects, ATM (Asynchronous Transfer Mode) switches, and ATM access and transport nodes. Network links may include copper wire links, microwave links, satellite links, co-axial links and optical fibre links. In some instances, repeaters or regeneration stations, which amplify a signal on a network link, may also be considered to be part of the network link.

Additional devices may be connected to the telecommunications network which are used to manage the telecommunications network. Examples include computers, databases, operating systems, terminals and printers. These devices are not considered network objects and do not form part of the network per se.

Figure 1:
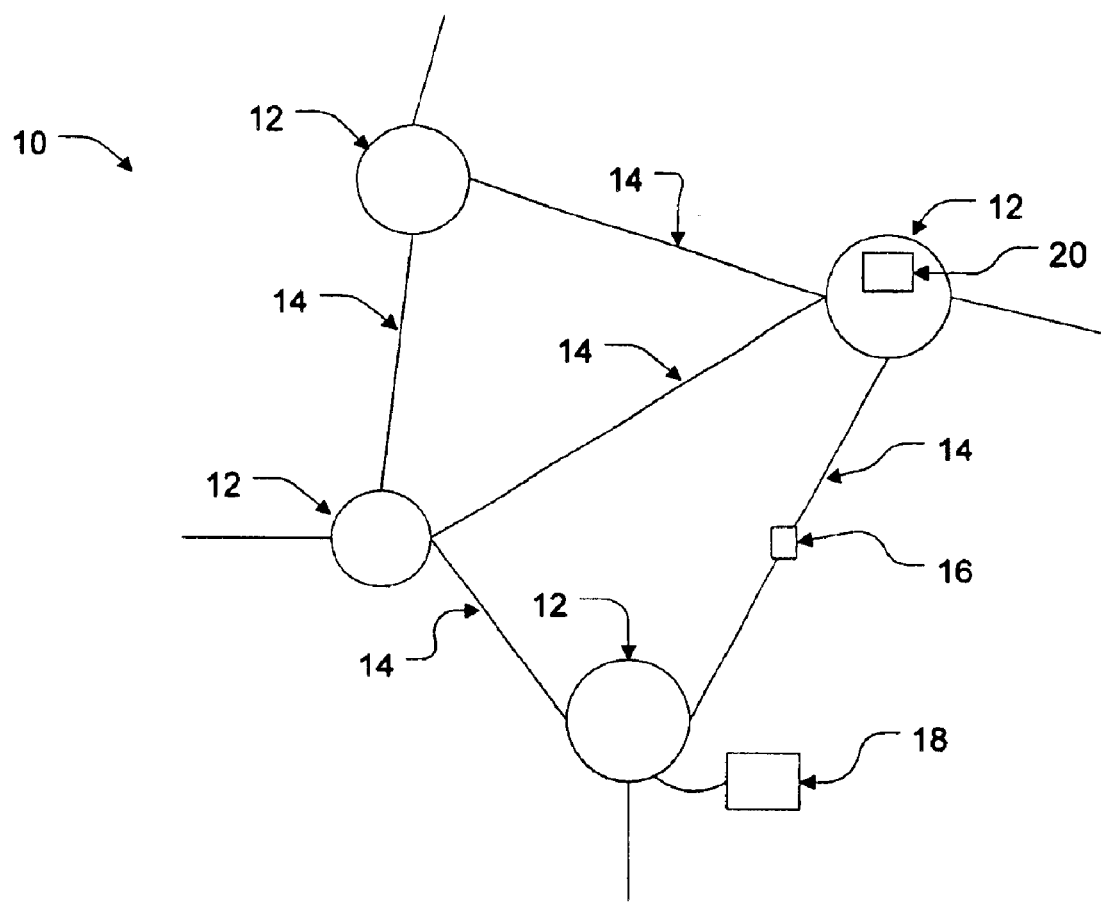
FIG. 1 is a schematic diagram of an exemplary network.

FIG. 1 shows an exemplary network 10 consisting of a plurality of network nodes 12 and a plurality of network links 14. The network 10 may also include repeaters or regeneration stations 16 in the network links 14 to amplify signals on the network links 14. Generally, network traffic consists of data or voice signals which travel on the links 14 between the nodes 12. The data or voice signals may originate at devices such as telephones or personal computers equipped with modems (not shown). As indicated above, various additional network management devices may be attached to the network for gathering information for monitoring and controlling the network ("network management information"). For example, computers 18 may be attached to network nodes 12 or network links 14 or there may be components or attachments 20 to network nodes 12 or network links 14 that are specifically designed to extract and gather network management information. These network management devices communicate with each other either through the network 10 or through a separate management network (not shown).

Figure 2:
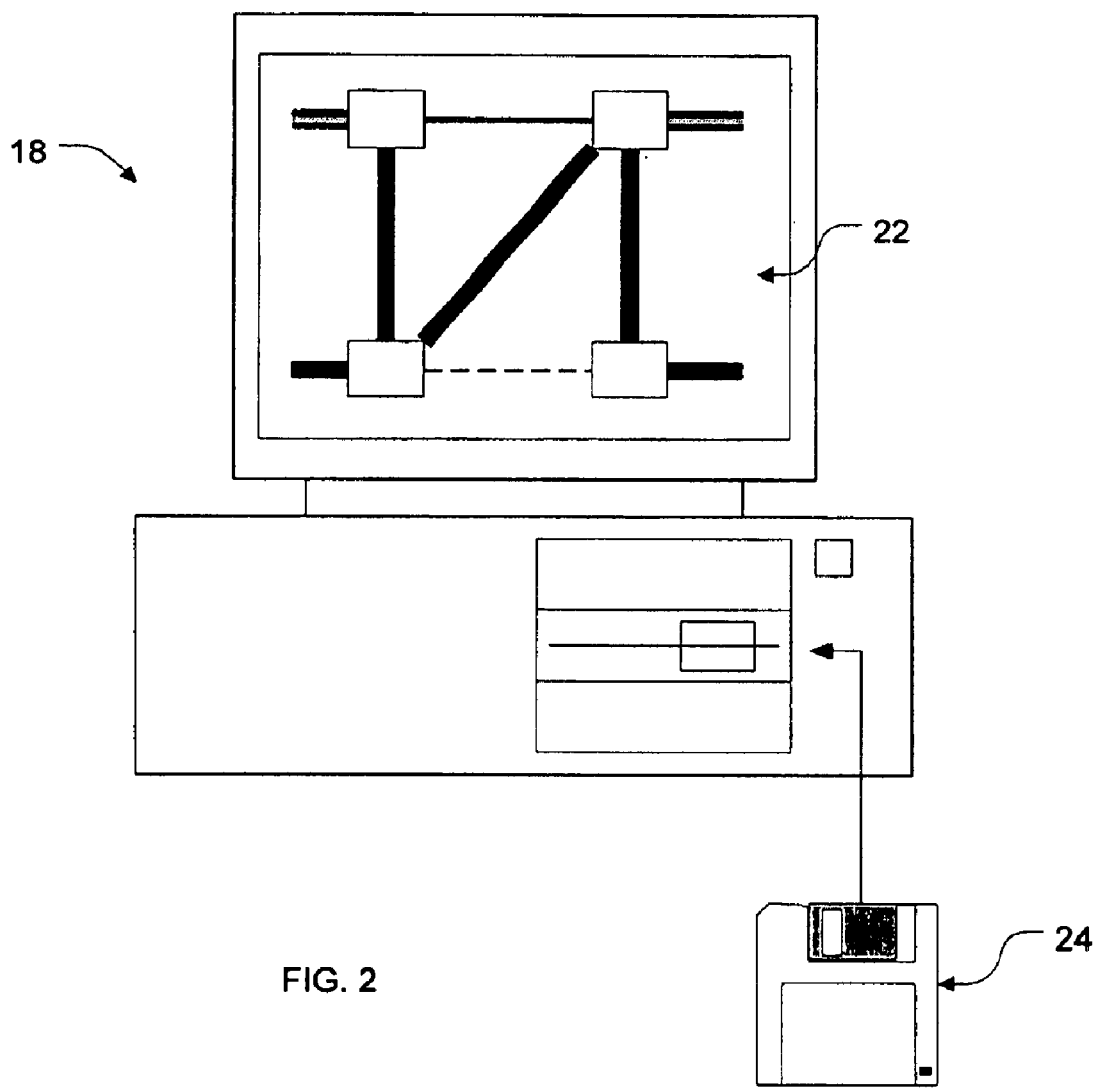
FIG. 2 is a schematic diagram of an exemplary computer running a network management tool in accordance with an embodiment of the invention.

A network management tool is generally a software application that runs on one or more of the network management devices such as the computer 18. FIG. 2 shows an example computer 18. The computer 18 receives network management information from the network 10 and passes the network management information to the network management tool which then processes it and presents it graphically on a display 22 with a graphical user interface (GUI) operating according to the method of the invention. The network management tool, including the method of the invention, may be implemented in a computer by way of program code stored in a memory in a computer, or by way of program code stored on computer media, such as a floppy disk 24, or implemented as a hardware solution in which a dedicated computer chip (not shown) or the like executes the steps according to the method.

Figure 3:
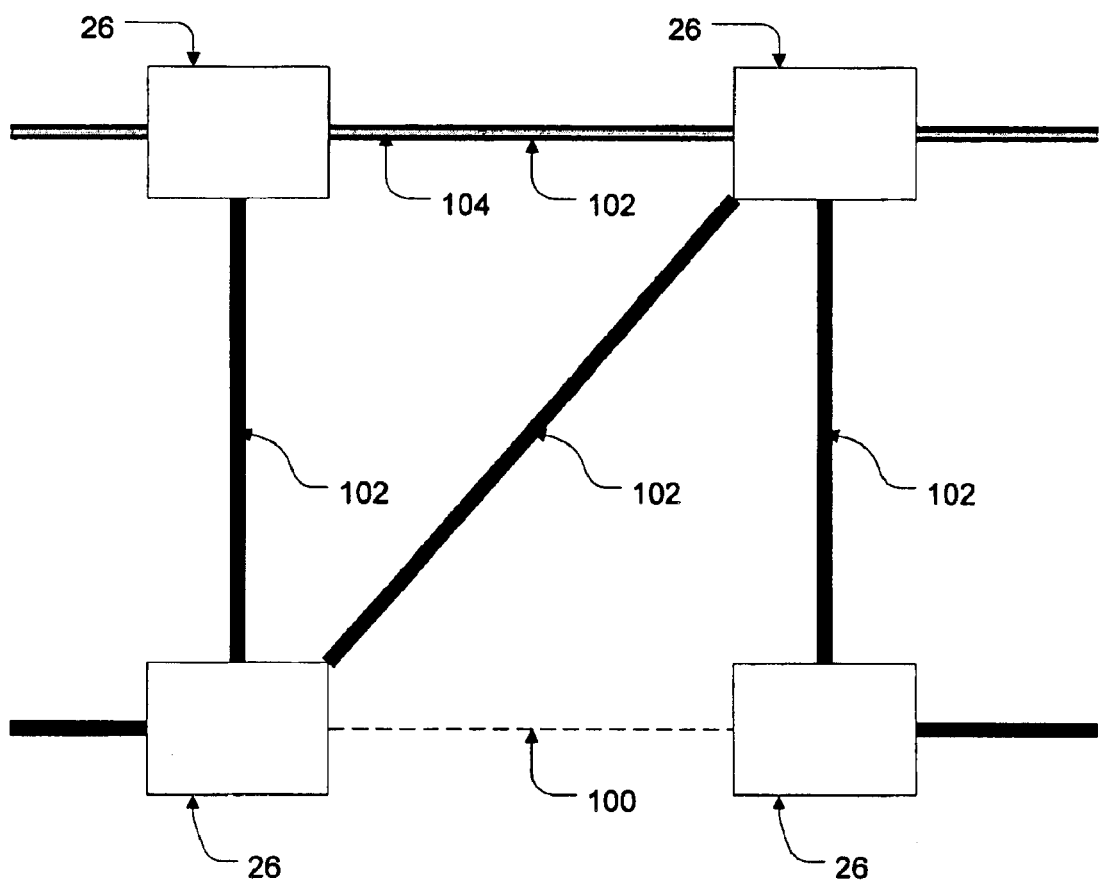
FIG. 3 is a graphical representation of the exemplary network shown in FIG. 1.

In the network management tool GUI, basic icons are used to represent each network object. FIG. 3 shows a graphical representation of the physical network shown in FIG. 1 as displayed by the GUI. In this particular example, network nodes 12 are shown as boxes 26 while network links 14 are shown as lines 100, 102 and connections are shown by lines 104. In FIG. 3, the additional network management devices such as the computer 18 used for gathering network management information are not shown.

In a network, network nodes 12 or network links 14 may be in a number of states. Several such states are specified by the OSI (Open Systems Interconnect) model. For example, a link may be in service (operational state=enabled) or may be not in service (operational state=disabled) due to some fault or error condition. Further, a connection formed on a particular link between nodes may have a status as an actual connection or a logical connection depending on whether or not a link is in service or out of service.

As shown in FIG. 3, in one embodiment of the method of displaying connection information according to the invention, an out-of-service link is represented by a line having a first visual characteristic such as a thin broken line 100 while an in-service link is represented by a line having a second visual characteristic such as a thick solid line 102. An existing connection is represented by a line having a third visual characteristic such as a thin solid line 104, which may be overlayed upon the thin broken line 100 or the thick solid line 102. In this case, the thin solid line 104 has a different pattern or gray-scale level than the thick solid line 102 and may be the same thickness as the thin broken line 100. Further, as seen in FIG. 3, when a thin solid line 104 is overlayed upon a thick solid line 102 representing an in-service link, the margins of the thick solid line 102 are visible.

In the example of FIG. 3, it is possible to quickly determine that the link shown by the thin broken line 100 is not in service and that all other links are in service. It is also clear that the link having the representation of the thin solid line 104 overlaying the thick solid line 102 is in service and has a connection on it. In this way, it is easy for even an inexperienced operator to understand the GUI. Because grey-scale levels or patterns are used to differentiate the thin solid line 104 and the thick solid line 102, it is possible for even a colour blind person to easily distinguish the different states of the links and the status of connections in the GUI. Further, because connections are represented the same way without regard to their status as actual or logical connections, the representation of the connections does not depend on network link state. This allows the representation or display of the network links and the connections as separate layers within the network management tool GUI.

In this embodiment, the thin broken line 100 used to indicate an out-of-service link is a dashed line. The thin broken line 100 may equally be a dotted line, a center line, or other form of broken line that will be visible to a user of the network management tool.

Figure 4:
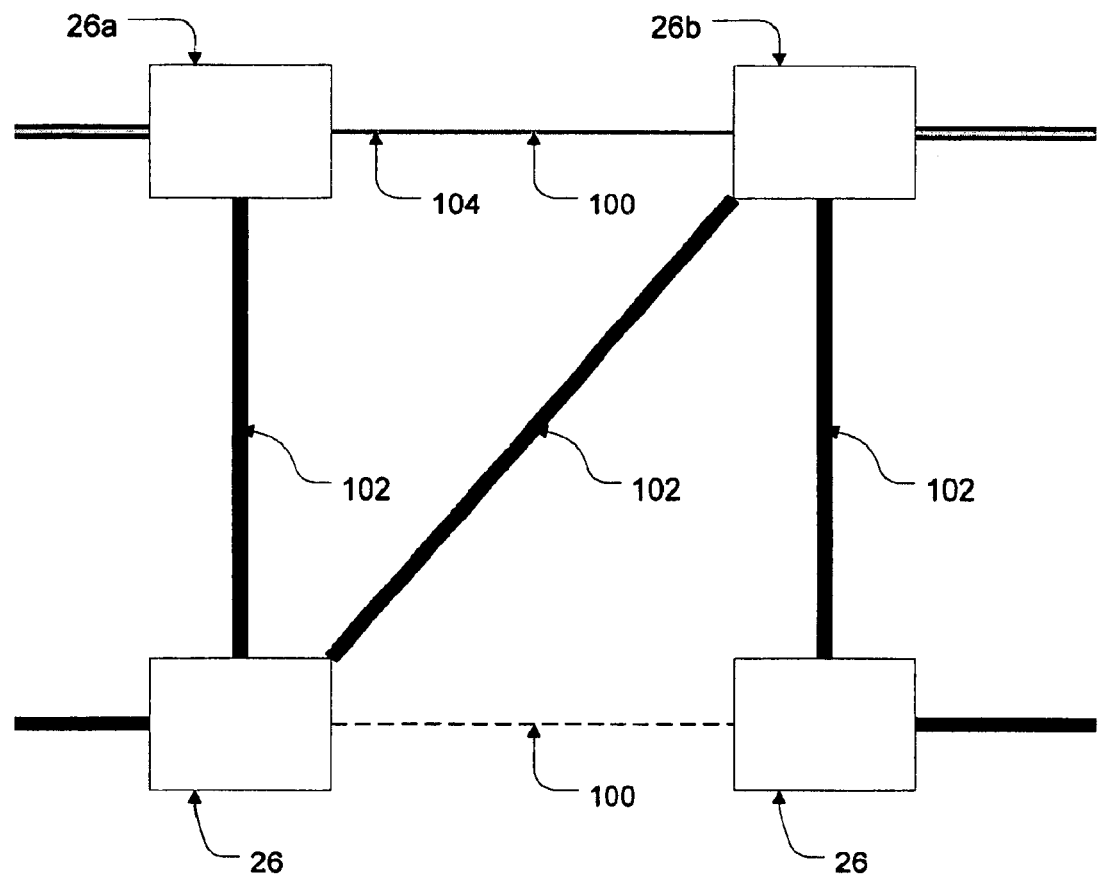
FIG. 4 is a graphical representation of the exemplary network shown in FIG. 1 under a different state.

FIG. 4 shows a representation of the same network as that in FIG. 3. This figure shows the GUI representation in the situation when a failed or out-of-service link may also have a logical connection that remains even though the physical link is no longer in service. In FIG. 4, the link between the nodes represented by boxes 26a and 26b has failed and is now out of service but a logical connection remains on the now out-of-service link. In this example, the thin solid line 104 indicating the logical connection overlays and entirely covers or obscures the thin broken line 100 indicating the out-of-service link. While not preferred, optionally, the thin solid line 104 representing the connection may have visual characteristics such that some visual characteristic of the line overlayed may be visible beneath the thin solid line 104.

In another embodiment, the thick solid lines 102 indicating in-service links are shown using one colour, for example green, while the thin broken lines 100 indicating out-of-service links are shown using another colour such as red, and the thin solid lines 104 indicating connections are shown by a third colour such as yellow. This approach further enhances the ability of a user of the network management tool to very quickly and easily determine the status of links and connections on the network.

Figure 5:
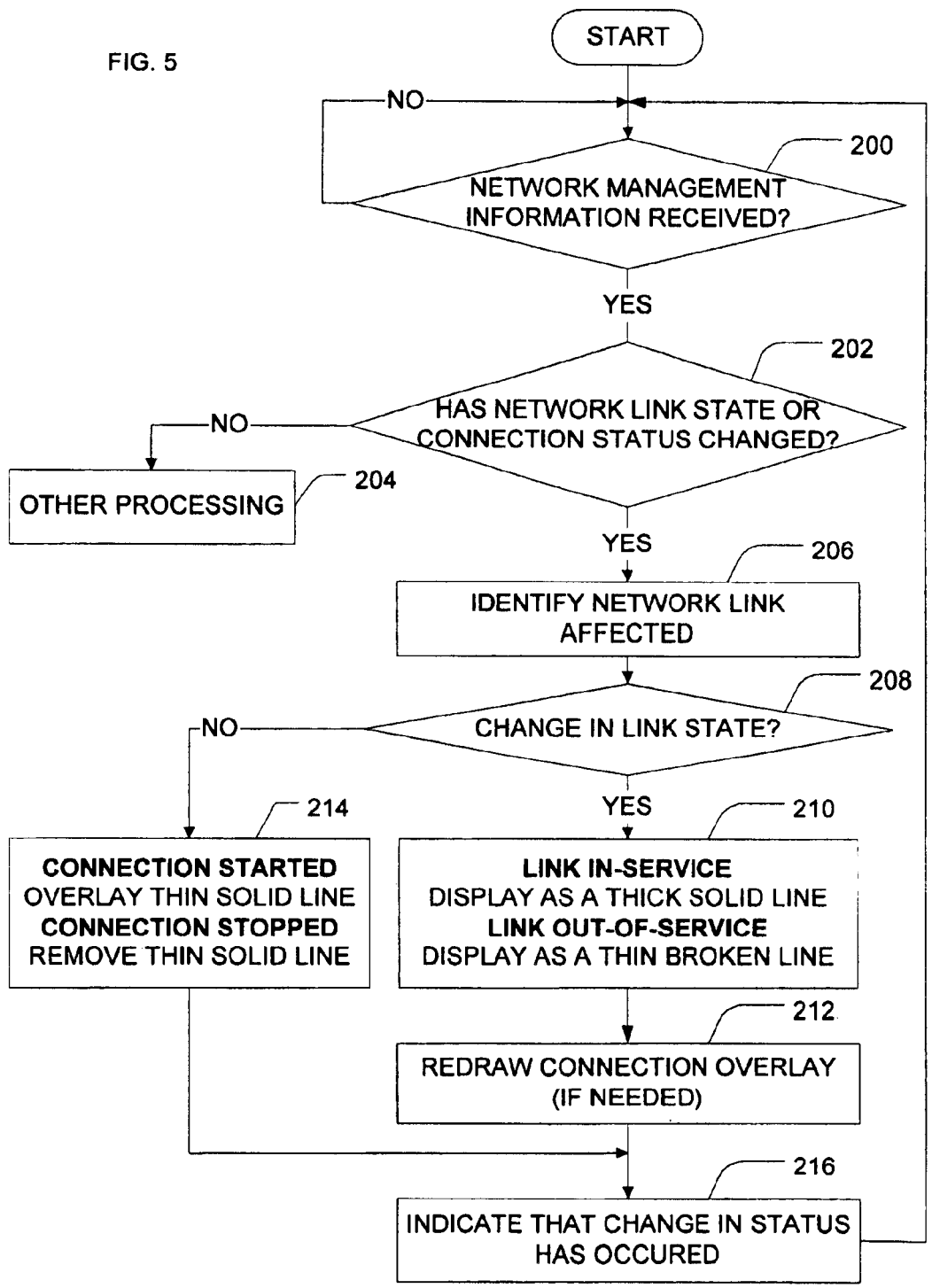
FIG. 5 is a flowchart showing a method for representing network link state and connection status in a graphical user interface according to an embodiment of the invention.

FIG. 5 is a flow chart showing a method for displaying connection information in a network management GUI according to an embodiment of the invention. The method starts and enters a loop waiting for network management information to be received (S200). When network management information is received, it is determined whether or not a network link state or a connection status has changed (S202).

At step S202, if there has been no change in network link state or connection status, the method moves to step S204 where the network management tool performs other processing such as the handling of maintenance conditions or the like. If there has been a change at step S202, an affected network link is identified (S206).

Next, it is determined whether or not the change is in the identified link state (S208). If so, the identified link is redrawn according to the new state: a thick solid line for a change to in-service or a thin broken line for a change to out-of-service (S210). Where necessary, connection status, for example, a thin solid line indicating a connection, for the identified link is redrawn as an overlay on the new line indicating the link state (S212).

At step S208, if the change is not in the identified link state, then a connection has either been started or stopped on the identified link. Thus, the display of the connection status for the identified link is updated in the GUI (S214). In particular, a thin solid line is either overlain or removed from the display of the identified link.

It will be apparent to one of skill in the art that there may be many ways in which the display of network link state and connection status may be updated according to S208 to S214. For example, in a network management tool for a simple network, it may be more convenient to redisplay (redraw) the entire network and connection overlays when there has been a change in state or status. In another example, the mechanism for displaying a change in network link state may involve redrawing a network link in the background color and then redrawing the representation of the link according to its state. In still another example, the mechanism for removing the display of a connection may involve the redrawing of the link according to its state such that the connection display is overwritten.

After completing step S212 or S214, the method proceeds to indicate that a change in state or status has occurred (S216). This indication could be made by flashing the display, activating a sound, or by flashing the link subject to the change. The method then returns to step S200 and waits until there is another change in network link state or connection status.

In this method, the display of connection status can be performed independently of the display of network link state. This simplifies the programming and logic required as compared to a network management tool in which the display of connection status is dependent on the link state. This also allows the network link state and connection status displays to be formed as separate layers with the connection status display overlayed on the link state display; updating one layer does not require an update in the other layer.

In addition to the embodiments described herein, there are also many other combinations of different visual characteristics such as thickness, continuity, shading, color, and others as will be apparent to one of skill in the art.

Other modifications will be apparent to those skilled in the art and, therefore, the invention is defined in the claims.

We claim:

1. A method for representing network link and connection information in a graphical user interface suitable for network management, comprising:
    receiving information about network link state and connection status within a network; and
    operating an output device to:
        represent each link in a first state as a line having a first visual characteristic;
        represent each link in a second state that is different from said first state as a line having a second visual characteristic, different from said first visual characteristic; and
        represent a connection on a given network link as a line having a third visual characteristic, different from said first and second visual characteristics, such that, when said given, network link is in said first state, said line representing said connection completely covers said line representing said given network link and, when said given network link is in said second state, said line representing said connection partially covers said line representing said given network link.

2. The method of claim 1, wherein, when said given network link is in said second state, said line representing said connection partially covers said line representing said given network link such that a margin of said line representing said given network link is visible.

3. The method of claim 1, wherein said first state is out-of-service and said second state is in-service.

4. The method of claim 1, wherein said line having said first visual characteristic is a thin and broken line and said line having said second visual characteristic is thicker than said line having said first visual characteristic.

5. The method of claim 4, wherein said line having said third visual characteristic is a thin and solid line that is at least the same thickness as said line having said first visual characteristic and less thick than said line having said second visual characteristic.

6. The method of claim 4, wherein said line having said third visual characteristic further includes a pattern that is different from said line having said first visual characteristic and said line having said second visual characteristic.

7. The method of claim 1, wherein each of said line having said first visual characteristic, said line having said second visual characteristic, and said line having said third visual characteristic is a different color from the others.

8. A method for representing network link and connection information in a network management graphical user interface comprising:
    receiving information about link state and connection status within a network; and
    operating an output device to:
        represent out-of-service links with a thin broken line;
        represent in-service links with a thick solid line, thicker than said thin broken line; and
        represent connections on a given link as a thin solid line that is at least as thick as said thin broken line and thinner than said thick solid line, wherein said thin solid line is overlayed on said thick solid line or said thin broken, line to represent a connection on a given link.

9. The method of claim 8, wherein said thin solid line obscures said thin broken line when overlayed thereon.

10. The method of claim 8, wherein said thin broken line is a dashed line.

11. The method of claim 8, wherein each of said thin broken line, said thick solid line and said thin solid line is a different color from the others.

12. The method of claim 8, wherein each of said thin broken line, said thick solid line and said thin solid line is a different pattern from the others.

13. The method of claim 11, wherein said thick solid line is green in color.

14. The method of claim 11, wherein said thin solid line is yellow in color.

15. The method of claim 11, wherein said thin broken line is red in color.

16. A computer readable medium containing computer executable code for adapting a computer input with network link and connection information to:
    output each link in a first state as a line having a first visual characteristic;
    output each link in a second state that is different from said first state as a line having a second visual characteristic, different from said first visual characteristic; and
    output a connection on a given network link as a line having a third visual characteristic, different from said first and second visual characteristics, such that, when said given network link is in said first state, said line representing said connection completely covers said line representing said given network link and, when said given network link is in said second state, said line representing said connection partially covers said line representing said given network link.

17. The computer readable medium of claim 16, wherein, when said given network link is in said second state, said line representing said connection partially covers said line representing said given network link such that a margin of said line representing said given network link is visible.

18. The computer readable medium of claim 16, wherein said first state is out-of-service and said second state is in-service.

19. The computer readable medium of claim 16, wherein each of said line having said first visual characteristic and said line having said third visual characteristic is a different pattern from the other.

20. The computer readable medium of claim 16, wherein each of said line having said second visual characteristic and said line having said third visual characteristic is a different pattern from the other.

21. The computer readable medium of claim 16, wherein each of said line having said first visual characteristic, said line having said second visual characteristic, and said line having said third visual characteristic is a different color from the others.

22. A network management tool comprising:
   means for receiving information about network link state and connection status within a network;
   an output device; and
   means for operating said output device to:
      represent each link in a first state as a line having a first visual characteristic;
      represent each link in a second state that is different from said first state as a line having a second visual characteristic, different from said first visual characteristic; and
      represent a connection on a given network link as a line having a third visual characteristic, different from said first and second visual characteristics, such that, when said given network link is in said first state, said line representing said connection completely covers said line representing said given network link and, when said given network link is in said second state, said line representing said connection partially covers said line representing said given network link.

23. A graphical user interface for displaying network link and connection information, said graphical user interface displaying:
   each network link in a first state as a line having a first visual characteristic;
   each network link in a second state that is different from said first state as a line having a second visual characteristic, different from said first visual characteristic; and
   a connection on a given network link as a line having a third visual characteristic, different from said first and second visual characteristics, such that, when said given network link is in said first state, said line representing said connection completely covers said line representing said given network link and, when said given network link is in said second state, said line representing said connection partially covers said line representing said given network link.

24. The graphical user interface of claim 23, wherein said display of said connections is independent of said display of said network links.

* * * * *